No. 672,048. Patented Apr. 16, 1901.
H. E. WAITE.
STATIC MACHINE.
(Application filed Mar. 8, 1901.)
(No Model.)

Witnesses
J. G. Hinkel

Inventor
Henry E. Waite
By
Attorneys

THE NORRIS PETERS CO., PHOTO-LITHO., WASHINGTON, D. C.

UNITED STATES PATENT OFFICE.

HENRY E. WAITE, OF NEW YORK, N. Y.

STATIC MACHINE.

SPECIFICATION forming part of Letters Patent No. 672,048, dated April 16, 1901.

Application filed March 8, 1901. Serial No. 50,388. (No model.)

*To all whom it may concern:*

Be it known that I, HENRY E. WAITE, a citizen of the United States, residing in the city, county, and State of New York, have invented certain new and useful Improvements in Static Machines, of which the following is a specification.

My invention relates to improvements in the method of clamping the plates of an influence-machine to each other and to the revolving shaft, its object being to provide a simple means for overcoming certain difficulties met with in the construction of this particular part of influence-machines.

It has been customary to rigidly clamp the revolving plates of such machines between more or less inelastic insulating-collars, soft rubber or other elastic washers being placed between the collars and the plates, while the plates are insulated from the revolving shaft by a suitable sleeve. It has been found by experience that during use the rubber washers mentioned are apt to yield and allow play between the washers and the plates, and the plates may then wear grooves in the insulating-sleeve over which they fit and drop down into the grooves thus formed. Upon attempting again to tighten up the clamping apparatus the plates break, or at best are placed under such strain that they are more liable to break thereafter. Moreover, no adequate means are provided to allow for expansion and contraction of the glass plates due to differences of temperature.

In my improvement I use an additional collar, between which and the clamping-collars is inserted a suitable spring forming an elastic cushion. The action of this spring or elastic cushioning device allows for expansion and contraction of the plates and compensates for wear between the plates and the washers, so that there is no lost motion between them.

Figure 1:
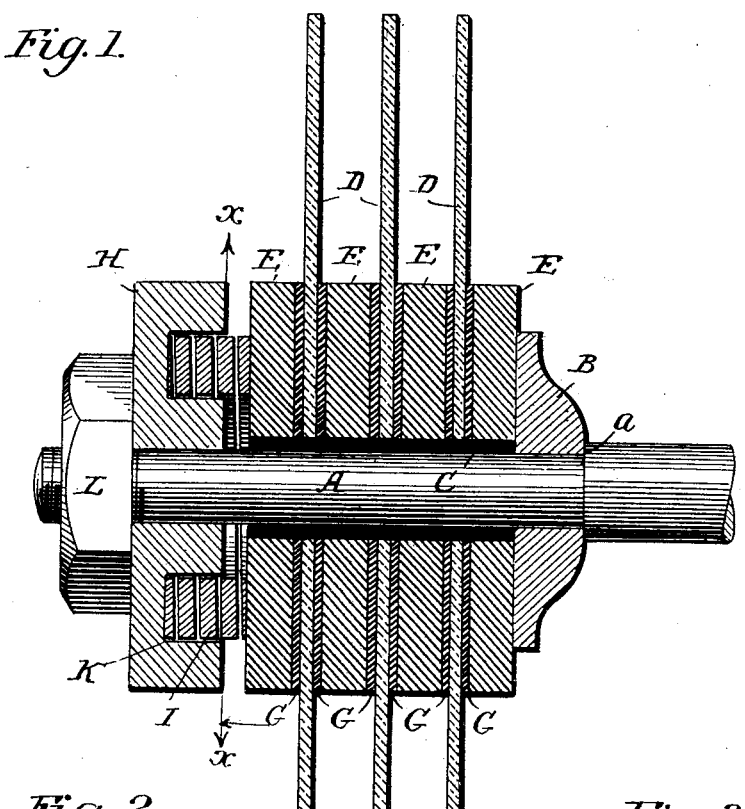
Figure 2:
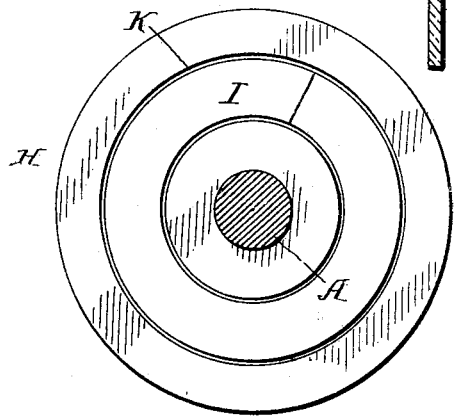

In the accompanying drawings, Figure 1 is a side view, partly in section, of an apparatus embodying my improvement. Fig. 2 is an end view on the line $xx$ looking in the direction of the arrow, and Fig. 3 is a modification.

Referring to the drawings, A represents the shaft of an influence-machine having a shoulder $a$ or other suitable means against which abuts the collar B, that fits tightly over the shaft or is secured to it. Suitable insulation, as a rubber sleeve C, is tightly fitted over the shaft to insulate the revolving plates D. Each plate D is placed between insulating-collars E, which may be of hard rubber, and between the plates and the collars are fitted washers G, of soft rubber or other elastic material. It has been usual to tightly clamp the collars together by suitable means; but I provide an additional collar H, slidable upon the shaft, between which and the outermost collar E, I place a spring of any suitable description, shown as a flat coiled spring I, partially embedded in a groove K in the collar H.

Figure 3:
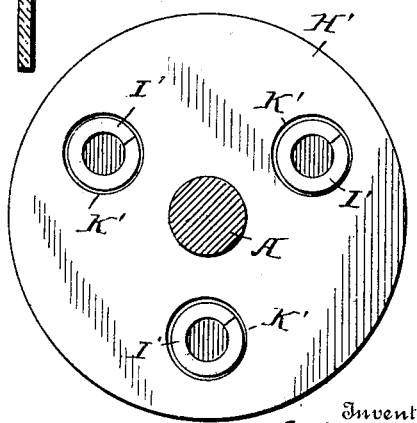

In Fig. 3 I have shown a modification in which a plurality of springs I' are shown in sockets K' in a collar H'. Means are shown, as a nut L, for pressing the collar H toward the revolving plates and holding it in the desired position. Upon tightening up nut L the spring I will press upon the outermost collar E, which pressure will be transmitted to all the collars, plates, and washers, effectually clamping them together. The result of this device is as hereinbefore stated and has been found to effectually prevent cracking of the plates from the various causes mentioned.

What I claim, and desire to secure by Letters Patent, is—

1. The combination with the revolving shaft and insulated plates of an influence-machine, of elastic cushioning means for clamping the plates together, substantially as described.

2. The combination with the revolving shaft and insulated plates of an influence-machine, of a spring for clamping the plates together, substantially as described.

3. The combination with the revolving shaft of an influence-machine and the plates separated by insulating-collars, of an additional collar for clamping the plates together, and an elastic cushion between the said collar and the insulating-collars, substantially as described.

4. The combination with the revolving shaft of an influence-machine and the plates separated by insulating-collars, of an additional collar for clamping the plates together, and a coiled spring between the said collar and the insulating-collars, substantially as described.

5. The combination with the revolving shaft of an influence-machine and the plates separated by insulating-collars and soft-rubber washers, of an additional collar for clamping the plates together, and an elastic cushion between said collar and the insulating-collars, substantially as described.

In testimony whereof I have signed my name to this specification in the presence of two subscribing witnesses.

HENRY E. WAITE.

Witnesses:
EDWIN A. YARNAL,
J. C. CALLAGHAN.